June 9, 1931.  J. H. HIGGINS  1,809,201

EXHAUST VALVE

Filed March 23, 1929

Inventor
J. H. Higgins
By
Attorney

Patented June 9, 1931

1,809,201

UNITED STATES PATENT OFFICE

JOHN HOWARD HIGGINS, OF AMARILLO, TEXAS

EXHAUST VALVE

Application filed March 23, 1929. Serial No. 349,412.

Figure 1:
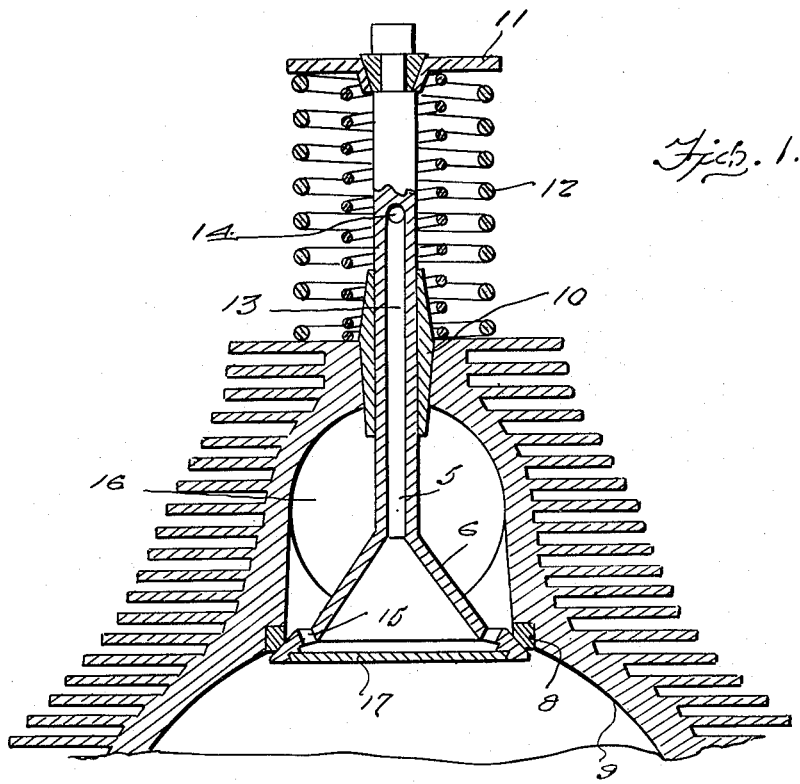
Figure 2:
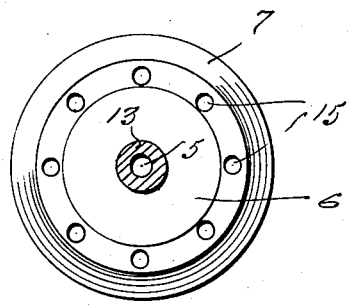

The present invention relates to valves for internal combustion engines and more particularly to the exhaust valves of air cooled motors, such as are commonly used in airplanes. The invention has for an important object to provide means for cooling the head of the valve during the operation of the engine by providing an air channel extending through the stem of the valve with an air intake port at its outer end and air discharge ports located in the head of the valve and communicating with the exhaust manifold to further utilize the suction created in the manifold by the exhaust from the various engine cylinders to cause the head of the valve to seat uniformly. A further important object of the invention is to provide a valve of this character which may be manufactured at a relatively low cost, which improves the operation of the engine by providing a more efficient seating of the valve, which insures a longer life to the valve, and which is otherwise well adapted for the purposes for which the same is intended. Other objects and advantages reside in the special construction, combination and arrangement of the various elements forming the invention as more fully hereinafter described and claimed, reference being had to the accompanying drawings forming part hereof, wherein like numerals refer to like parts throughout the specification and in which Figure 1 is a fragmentary sectional view through an engine cylinder showing a longitudinal sectional view of the valve in operative position therein, and Figure 2 is a transverse sectional view through the valve stem looking down upon the head of the valve.

Referring now to the drawings in detail, for the purpose of illustration I have disclosed a preferred embodiment of my invention which comprises a valve for internal combustion engines and includes a valve stem 5 having a hollow head 6 formed at one end with its edges bevelled as shown at 7 for seating on the valve seat 8 of the engine cylinder 9. The valve stem is slidably inserted in a guide 10 fitted in an opening in the wall of the cylinder, the outer end of the valve stem being provided with a collar 11 for retaining a coil spring 12 about the stem of the valve in the usual manner. It is understood that the valve may be operated in any suitable manner well known in the art for moving the same into open position for permitting the escape of the burnt gases from the cylinder, when the valve is used as an exhaust valve as intended. The stem of the valve is hollow and provides an air channel 13 therein having an air intake port 14 extending through the wall of the stem adjacent its outer end. The air channel 13 communicates with the interior of the head 6 and said head is also provided with a series of discharge ports 15 disposed immediately inwardly of the bevelled edge 7. The air from the head is thus admitted into the exhaust manifold 16 of the engine. The head of the valve preferably is of a two-piece construction for the purpose of reducing the cost of manufacture and is cast or otherwise constructed with its end open and fitted with a cap or cover 17 whereby to close communication between the interior of the head and the interior of the engine cylinder.

In the operation of the valve, it will be apparent that air may freely enter the intake port 14 into the channel 13 for circulation within the head 6 and discharged through the ports 15 into the exhaust manifold. Thus the valve head is substantially cooled through the passage of air therethrough. Furthermore, the suction of air through the valve by the action of the other cylinders of the engine when discharging the burnt gases therefrom, will cause the valve to seat more uniformly and in this manner to promote efficiency in the operation of the valve and insure longer life to the valve as well as enabling the engine to efficiently operate for a considerable period without necessitating grinding or other repairs to the valve and its associated mechanism. It is obvious that the invention is susceptible of various changes and modifications without departing from the spirit of the same or the scope of the appended claim, and I accordingly claim as my own all such forms of the invention to which I am entitled.

I claim:

A valve for combustion engines comprising a hollow valve stem having an air intake port adjacent its outer end, a hollow conical head at the inner end of the stem providing an air chamber therein communicating with the hollow stem, the lower edge of said head being off-set outwardly providing a horizontal shoulder surrounding the head, said shoulder having a plurality of discharge ports at uniformly spaced intervals, said ports being inclined towards the walls of the exhaust manifold of the engine, whereby the air discharged from said ports is deflected by the walls of the manifold, causing a circulation of air within the manifold.

In testimony whereof I affix my signature.
JOHN HOWARD HIGGINS.